Oct. 20, 1936.    H. R. SPITLER ET AL    2,057,983
OPTICAL INSTRUMENT
Filed Aug. 10, 1934    3 Sheets-Sheet 2
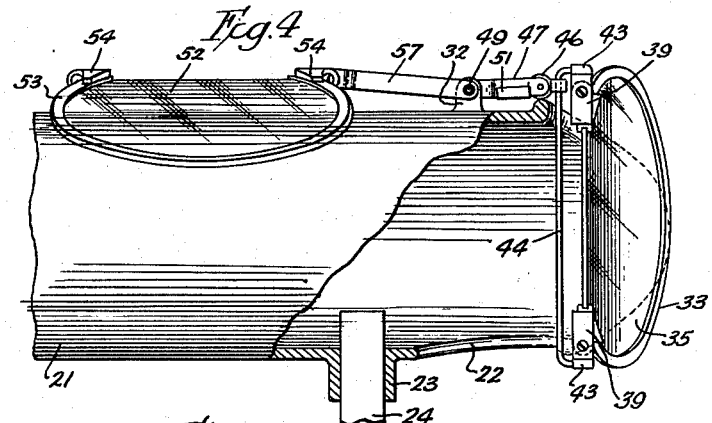
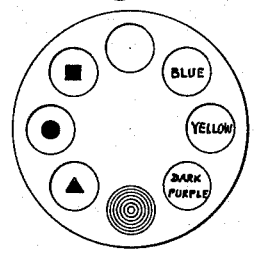
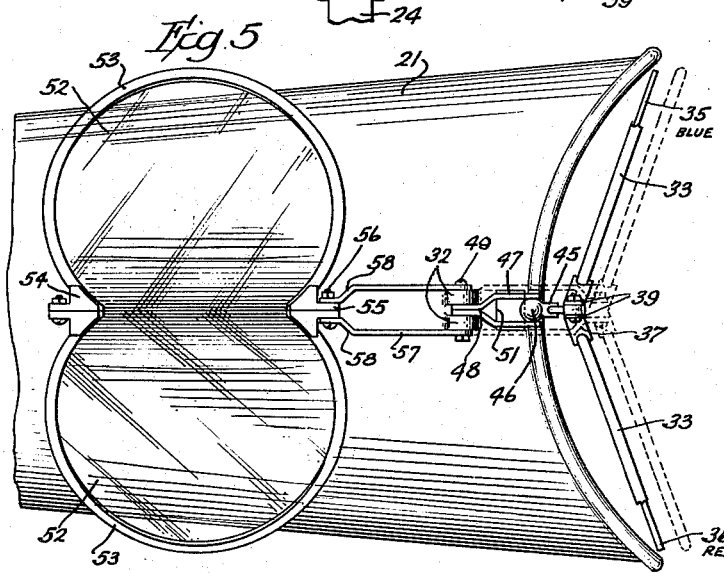
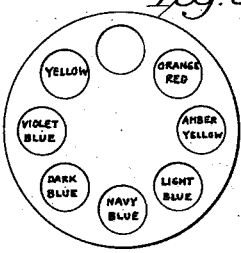
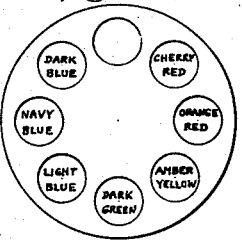
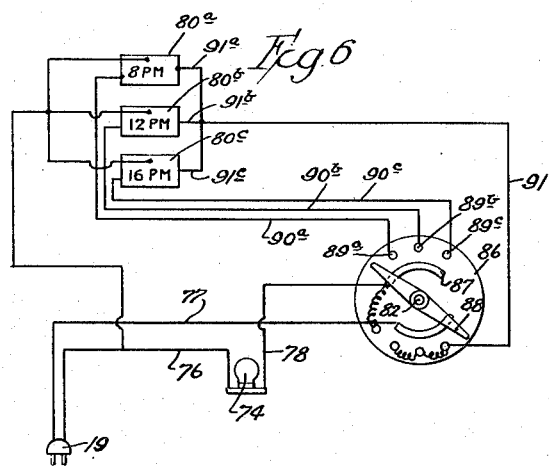
Inventors
HARRY RILEY SPITLER &
ALEXANDER S. CAMERON
E. N. Lundy    Atty.

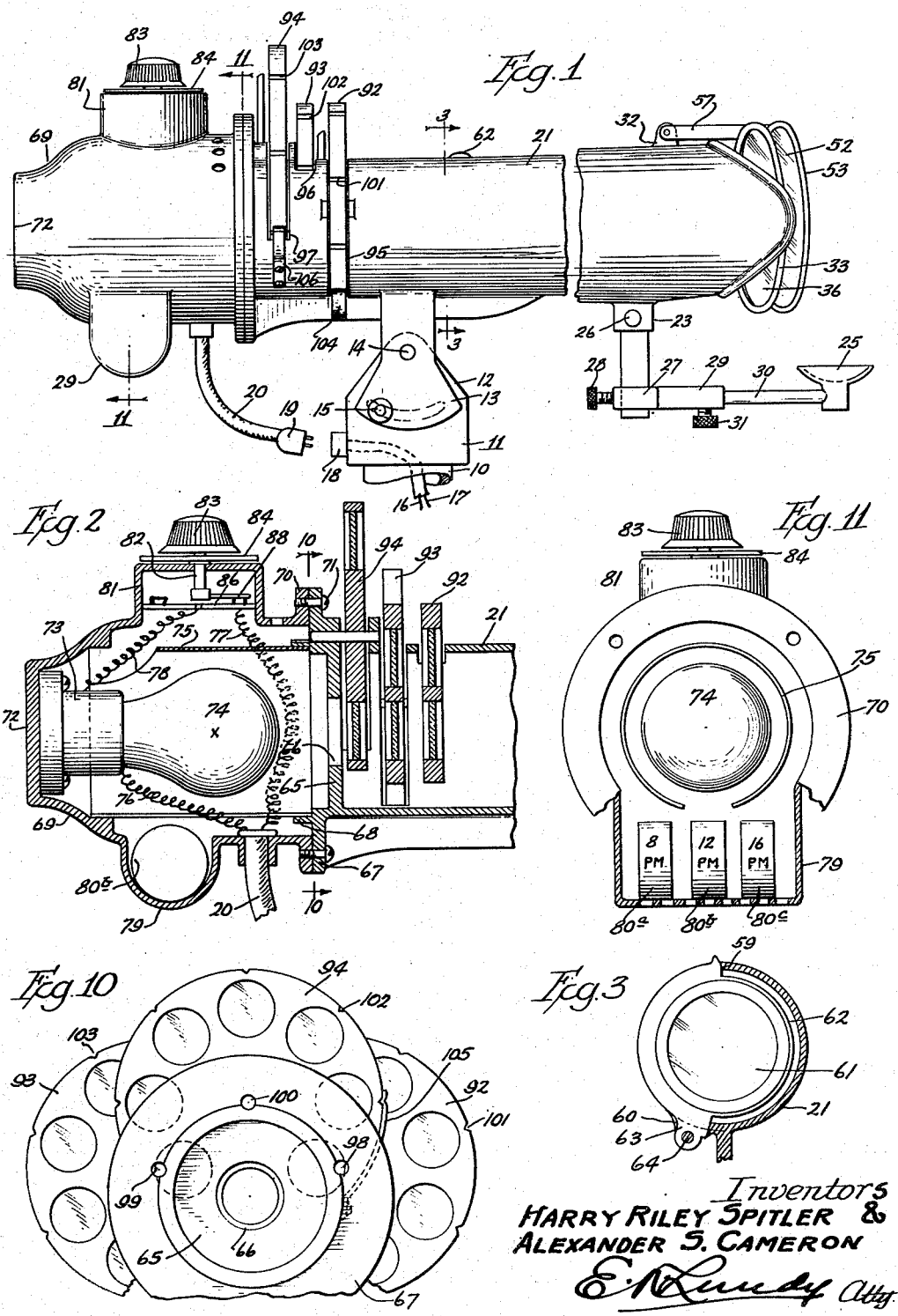

Oct. 20, 1936.  H. R. SPITLER ET AL  2,057,983
OPTICAL INSTRUMENT
Filed Aug. 10, 1934  3 Sheets-Sheet 3
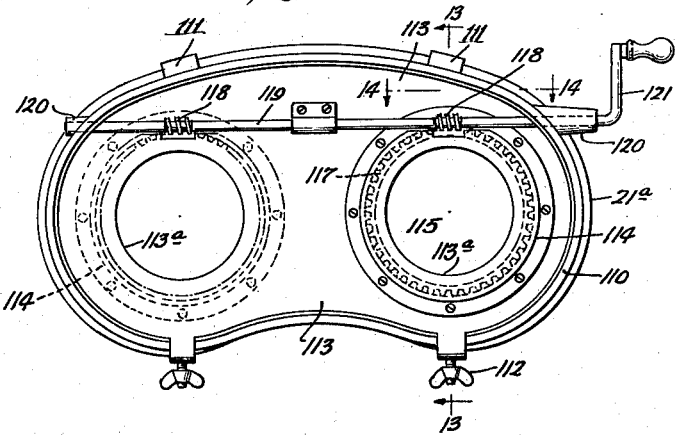
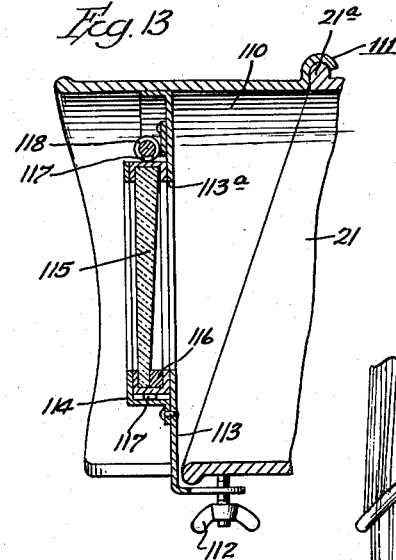
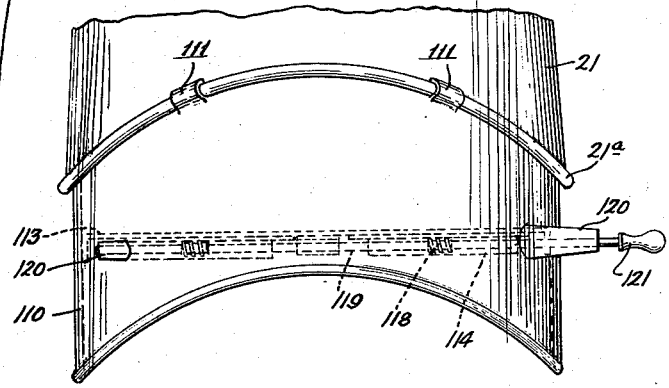
Inventors
HARRY RILEY SPITLER &
ALEXANDER S. CAMERON Patented Oct. 20, 1936

2,057,983

UNITED STATES PATENT OFFICE 2,057,983

OPTICAL INSTRUMENT

Harry Riley Spitler, Eaton, Ohio, and Alexander S. Cameron, Chicago, Ill.; said Alexander S. Cameron assignor to William J. Cameron, Chicago, Ill.

Application August 10, 1934, Serial No. 739,328

7 Claims. (Cl. 88—20)

This invention relates to an optical instrument and to a new and novel method of control of the associated and supportive functions of vision which is accomplished by the use of selected light frequencies. By the use of this instrument certain anomalies or functional departures from normal may be overcome, corrected, revised or retarded by causing reactions to take place by direct stimulation through the eyes of the patient by the employment of properly selected light frequencies in the visible range of the spectrum which are projected through the refractive media of the eyes to the retina of the eye or eyes.

This invention is based upon the discovery that a particular patient will react to one light frequency band more readily than to other frequencies, depending upon the characteristic biotype or physical make-up of the patient; and that another type of patient may respond quicker to a different frequency band than the one to which the first patient made ready response.

In the use of this instrument and in the practice of its associated technique it has been definitely ascertained that selected light frequency bands of the visible range of the spectrum produce specific biological, physical, chemical, physiological, functional and psychological reactions in a patient.

In physics, the visible spectrum is divisible into seven so-called colors and its divisions have been designated as one octave of the electro-magnetic spectrum. The electro-magnetic spectrum is the complete range of radiant energy and frequencies, and for some purposes (as in therapeutics) such spectrum is divided into six general divisions or bands, known respectively as the radio-frequency band, the infra-red band, the visible band, the ultra-violet band, the Roentgen band, and the radium band. A physicist (Dr. Angstrom) established a standard unit for measuring the wave lengths of radiant energy, which unit is commonly termed an "Angstrom unit" (A. U.), each of which is 1/10,000th of a micron or 1/100,000,000th of a centimeter.

In the practice of the present invention the frequencies in the visible range of the spectrum are used because this octave is that portion of the electro-magnetic spectrum which the normal human eye has been evolved to receive, absorb, transform and utilize.

The operator in using this invention makes use of the power-factor or energy content of the frequency transmitted or absorbed by various filters, since each filter produces definite reactions in the patient different from those of the other filters, dependent upon the respective wave-lengths or frequencies. A very practical and authentic tabulation of visible light in terms of wave-lengths in Angstrom units has been made as follows by Lueckish and Pacini:—

| | Angstrom units |
|---|---|
| Red | 6200–7700 |
| Orange | 5900–6200 |
| Yellow | 5500–5900 |
| Green | 4900–5500 |
| Blue | 4300–4900 |
| Violet | 3900–4300 |

Light frequency being the reciprocal of wave-length, it has definitely been determined that the lower frequency end of the visible spectrum has an exciting and irritating effect upon certain nerve centers; while the higher frequency end of the visible spectrum produces depressing effects. Different frequencies, in terms of wave-length, focus differently with respect to the retina of the eye, viz;—when yellow light (5500–5900 A. U.) is in focus on the retina, a blue light (4300–4900 A. U.) will focus in front of the retina, while a red light (6200–7700 A. U.) will focus in back of the retina. Therefore it is obvious that some sort of a physical or physiological change is necessary to cause the selected frequencies to focus definitely and truly upon the retina in order clearly to see any colored test-object.

Authorities in morphology designate the nervously or physiologically balanced or normal type of person as the middle type (which is herein referred to as "syntonic"); those below normal who are usually weak, highly sensitive and nervous are designated as the "asthenic" type; while those above normal who are usually phlegmatic, dull and not easily excited have been herein designated the "pyknic" type.

The operator, using this present instrument and practicing its technique, will first determine in which of the three biotypes the patient morphologically belongs.

The next step is to place the patient in a receptive condition for the frequency to be prescribed, such conditioning being termed "nascentization" and is properly applied only after it has been determined if the ocular difficulty is local (within the orbit) or non-local (due to disturbances of the associated or supportive functions of vision). Nascentization is accomplished by permitting the patient to view a white light through differently colored scopes, thus disturbing the physiological complacency by setting up physiological or nervous antagonisms. Usually, in a comparatively short time, the colors cease to visually alternate in conscious perception and become mentally fused or nearly fused. This being a visual experience that is new to the patient it places him in a physiologically receptive condition to readily react to the syntonic frequency to be used to correct his biological, physiological, or other departure from normal.

For the syntonic application, the operator has selected a filter or filter combination which absorbs or transmits the frequencies best adapted to stimulate or depress the nerve centers involved, and he places such filter or filters before a white light directed into the patient's eyes.

The lamp may be flashed on and off rhythmically at the desired speed. These light frequency bands, or these flashes of light frequency bands, reaching the retina of each eye, cause optical and physiological retinal changes which, of course, stimulate normally existent nerve channels to the involved nerve centers. Such stimulations, repeated daily or periodically over a short space of time, will recondition and correct defects, anomalies or other departures from normal which may involve the visual sense, its associated or supportive functions.

Means are provided which are adapted to cause an apparent movement of the light in a prescribed orbital path so that the eyes of the patient in following such apparent movement will exercise the extra-ocular muscles resulting in a beneficial stimulation of the latter.

In devising this instrument numerous objects have been kept in mind, among which may be mentioned the provision of an optical instrument that is novel in construction; dependable in operation, effective in performing the purposes for which it has been designed; durable in the formation and arrangement of the parts comprised in its make-up; simple to manipulate; and economical to manufacture, so that it may be sold to the user for a reasonable retail price. Numerous other objects and advantages will be apparent to others, skilled in the art, after the construction and operation of the apparatus is understood.

It is preferred to carry out this invention and to accomplish the divers objects thereof in substantially the manner hereinafter fully explained and as particularly pointed out in the claims, reference being herein made to the accompanying drawings that form a part of this specification.

In the drawings:—

Figure 1 is a longitudinal side view of the apparatus, a portion of which is broken away to disclose interior arrangements.

Figure 2 is a vertical axial section of the rear end portion of the apparatus that is farthest from the patient.

Figure 3 is a transverse section taken on line 3—3 of Figure 1.

Figure 4 is an axial vertical section at the front end of the apparatus which is nearest the patient.

Figure 5 is a fragmentary top plan of the portion of the structure shown in Figure 4.

Figure 6 is a schematic diagram of the electric wiring.

Figures 7, 8 and 9 are front or face views of the three filter wheels used in this apparatus.

Figure 10 is a transverse section on line 10—10 of Figure 2 looking in the direction of the arrows.

Figure 11 is a transverse section on line 11—11 of Figure 1 looking in the direction of the arrows.

Figure 12 is a vertical elevation of the front end of the instrument which is nearest the patient showing the means for causing an apparent orbital movement of the light.

Figure 13 is a vertical section on line 13—13 of Figure 12, drawn to a larger scale.

Figure 14 is a horizontal section on line 14—14 of Figure 12, drawn to an exaggerated scale to illustrate details of construction.

Figure 15 is a top plan of the structure shown in Figure 12.

The drawings are to be understood as being more or less schematic and are for the purpose of disclosing a typical or preferred embodiment of the instrument. In said drawings the same reference characters are employed to identify like parts wherever they appear throughout the different views.

The instrument consists of an elongated hollow or tubular head adjustably mounted upon the upper end of a suitable standard. The standard is shown in the form of an upright pipe 10 having its lower end mounted in a heavy base or tripod (not shown) and provided with a cap 11 at its top having a flat extension 12 that is positioned between a pair of spaced lugs 13 to which the extension is movably connected by a pivot pin 14 to permit tilting movement of the head that is anchored to the lugs 13. A manually operated hand-wheel 15 has its threaded shank inserted through in a smooth hole in one of the lugs and screws into a threaded hole in the other lug while the adjacent portion of the extension 12 has an arcuate slot through which the wheel shank passes. After the head has been properly tilted the wheel 15 is turned and the parts are frictionally clamped together. An insulated cable containing conductor wires 16 and 17 is disposed in the standard, the lower end of which cable leads to an electric service outlet and the other end of said cable terminates in one member 18 of a separable electric coupling. The other member 19 of the coupling is connected with a short insulating cable 20 leading to the different electric elements in the head of the apparatus. The structure above described permits separation and removal of the head from the standard for compact storage or transportation of the instrument in knock-down condition.

The head and operative portion is in the form of an elongated structure the body of which is preferably a hollow casing 21 that tapers slightly towards one end and is disposed with its widest portion towards the patient. This latter end is herein designated as the front or forward end, and the other end, which is farthest from the patient, is herein identified as the back or rear end. A nose recess 22 is made at the front end of the lower wall of the casing and slightly back of this recess there is a transverse rectangular slotted boss 23 in which is adjustably mounted a vertical post 24 to support the chin-rest cup 25. A thumb screw 26 turned into the boss 23 clamps the post 24 in place. A collar 27, adjustably clamped in place on post 24 by a thumb-screw 28 and has a hollow extension 29 projecting horizontally therefrom to receive the adjustable rod 30 of the chin-rest cup, which rod is clamped in place by a thumb-screw 31. The above arrangement permits proper adjustment so that the patient's chin may be comfortably rested on the cup 25 with the eyes disposed in the vertically horizontal plane of the axis of the tubular head or casing 21.

Near its front end the upper arc of the wall of casing 21 has a pair of spaced upstanding pivot ears 32 upon which two pairs of colored scopes are hingedly mounted so as to be interchangeable and reversible. Figures 4 and 5 show one pair of scopes in use and the other pair laid back out of use. These nascentizing scopes should generally be used, but it is possible to employ other means to secure reactions in the patient without the use of scopes.

The reversible scopes which are disposed in front of the open end of the casing are of red and blue glass and consist of lobe shaped channeled frames 33 and 34 disposed in vertical planes that are slightly oblique to each other, as seen in Figure 5, and they support respectively red glass plate 35 and blue glass plate 36, that meet each other at their inner edges in a straight line juncture. At the top and bottom of this juncture of the glass plates the ends of the frames meet each other in the form of brackets 37 and 38 having vertical clamp lugs 39 and 40 that are drawn towards each other by screws or bolts 41 and 42 respectively. Horizontally disposed sockets 43 project from the lugs to receive the lateral ends of a guide rod 44 that extends between and connects the brackets 37 and 38 as shown in Figure 4.

The structure for mounting the red and blue scopes on the casing consists of a radial boss 45 projecting from a metal ball or sphere 46 that is mounted for swiveling movement between the separated portions 47 of a pair of metal plates 48 hingedly mounted between the before mentioned pivot ears 32 by means of the pivot 49. The guide rod 44 slidably passes through a transverse guide bore made in the boss 45. The flat plates 48 with their spaced offset portions 47 provide a Y-shaped yoke to seat the ball in concave depressions 50 in adjacent faces of the plates and a U-shaped metal clip 51 is forced onto and fits the outside faces of the plates, after the ball has been placed in the seats in order to retain the parts in assembly.

In the position shown in Figures 4 and 5 the red scope is in front of the left eye and the blue scope is in front of the right eye of the patient. In order to reverse this disposition of the scopes they are moved upwardly so that guide rod 44 slides through boss 45 until the latter engages the lower end of the rod and the scopes are positioned above the upper wall of the casing 21. The scopes are then swung downwardly using the ball as a pivot until the straight line juncture between the glass plates is again in a vertical position and in front of the open end of the casing. The blue scope will now be in front of the left eye and the red scope will be in front of the right eye.

The second pair of scopes, preferably two green glass plates 52, 52, are mounted in lobe-shaped channel frames 53, 53, and are hingedly mounted on the lugs 32 so that they may be swung back and out of position on the top of the casing 21 or dropped down in front of the patient's eyes outside the red-blue scopes to be used in combination with the latter. The frames 53 are connected to each other by clamp brackets 54 having side by side lugs 55 through which a pivot pin 56 passes, and a pair of spaced links 57 connect the lugs 55 to the upstanding ears 32 on the casing. The links are disposed parallel to each other except that adjacent the lugs 55 said links have offset deflections 58 in opposite directions to properly space the links far enough apart that when the scopes have been swung over and down in front of the scopes 35, 36, the links 57 will straddle and be disposed along each side of the arms 47. These links operate with a hinging action at each end upon the respective pivots 49 and 56.

The scopes which have been above described are employed during the nascentization of the patient, and the red scope is placed before the non-dominant, non-fixating eye. If the ocular disturbance of the patient is solely within the orbit, such as departures from normal of the eye globe or within the eye globe, or the extrinsic or intrinsic muscles, then the patient is nascentized with both pairs of scopes before the eyes. On the other hand, if the ocular disturbance has its origin in some one or more of the associated or supportive functions of vision, solely external to the orbit, the patient is nascentized only with the red and blue scopes with the red scope before the non-dominant or non-fixating eye as above mentioned.

At a suitable transverse plane near the tilting lugs 13 the casing is provided with a relatively wide slot 59 adjacent which there is a pair of spaced ears 60. A collimating lens 61 is mounted in an annular frame 62 that fits into the slot 59 and is provided with an offset lug 63 that is inserted between ears 60 and pivotally mounted on a pin 64. The collimating lens is double convex and is frosted or ground preferably upon both sides, and the frame may be readily moved into and out of the slot 59 to position the lens across the axis of the casing or to remove the lens from the interior of the casing according to the character of the treatment being performed. The instrument, however, may be made without the collimating lens by using a diffuser or diffused source of light and filters relatively larger size than herein shown.

The rear portion of the casing is cylindrical in shape and there is a transverse wall 65 providing a diaphragm that has a central aperture 66 disposed in axial alinement with the collimating lens 61. There is an exterior annular flange 67 on the casing that is substantially a continuation of the diaphragm 65 and there is a concentric flange 68 projecting rearwardly from the annular flange 67. These flanges provide means for mounting the lamp housing 69 of the head and which has an open end to fit over the concentric flange 68 and has an annular flange 70 that fits against the annular flange 67. Said last-mentioned flanges are connected to each other by a plurality of screws or bolts 71.

The lamp housing is of irregular shape having generally a cylindric form, and it is open at one end where it is attached to the tubular casing 21, while its other end is closed by a transverse vertical wall 72. A porcelain electric light socket 73 is mounted upon the inner face of wall 72 and an incandescent electric lamp or bulb 74 of a definite wattage (usually 50 w.) is carried in said socket to provide the illumination that is desired in the use of this apparatus.

In order to protect and heat insulate the adjacent structures a split cylinder 75 of metal is removably inserted longitudinally over the bulb and frictionally maintained in position by its inherent springiness when engaged with the wall of the housing around the socket. Vent openings in the top of the housing permit egress of the hot air out of the housing.

One of the electric conductors 76 in cable 20 after entering the lamp housing leads direct to the base terminal of the socket and the other of said conductors 77 leads to the special central switch (to be later described) and thence by a short lead 78 to the shell terminal of the socket so that the circuit through the bulb is completed by and controlled through this switch.

Across the bottom of the lamp housing is a semi-cylindrical hollow embossment 79 that opens at its top into said housing and contains a plurality of electric flashers, preferably three, designated as 80ᵃ, 80ᵇ and 80ᶜ. These flashers which are schematically shown, may be any of the well-known commercial types that are capable of being adjusted so that they make and break a circuit rhythmically at any desired speed or number of times per minute. For the purposes of this invention it may be stated the devices 80ᵃ, 80ᵇ and 80ᶜ are adjusted to flash at the rate of eight, twelve, and sixteen per minute respectively.

The upper portion of the wall of lamp housing 69 is provided with a cylindrical shaped dome 81 having a vertical axis that is transverse to and intersects the longitudinal horizontal axis of the housing. Within this dome 81 is mounted the control switch for the electrical elements of the apparatus, the movable member of which switch is carried by a central spindle 82 that passes out centrally through the top of the dome and has a hand operated wheel 83 secured to its projecting upper portion.

A scale 84 on the top of the dome and a pointer 85 on the wheel indicate the relative positions of the operating or movable parts of the switch.

The switch consists of a circular plate or disk 86 having an elongated segmental contact 87 arranged concentrically around the spindle and the latter carries a wiper arm 88 that is moved into engagement with segmental contact 87 by rotation of the wheel 83 to light the bulb and remains in such engagement throughout the rotary reciprocatory movement of the wheel. Conductor 78 has electrical connection with the segment 87. A plurality of spaced contacts 89ᵃ, 89ᵇ and 89ᶜ are arranged concentrically on the disk 86 and have electrical connection with the respective flasher devices 80ᵃ, 80ᵇ and 80ᶜ through separate conductor wires 90ᵃ, 90ᵇ and 90ᶜ. A single conductor 91 leads from the common center of the switch to adjacent the flashers where it is provided with branches 91ᵃ, 91ᵇ and 91ᶜ leading into the respective flashers to complete the circuit through the element that has been selected by the operator through the rotation of the wheel 83.

When an application is to be made to the patient the operator need only to turn the wheel clockwise until the pointer is opposite the desired space on the scale or indicator. The lamp is lighted and remains constant so long as the pointer indicates "on" but when the pointer is moved to the next space the lamp will be flashed on and off rhythmically at a speed of eight per minute. The same is true when the pointer is at the other flasher spaces on the scale except that the speed of the flashing is increased to twelve or sixteen per minute.

The light center of the lamp 74 axially alines with the opening 66 in the apertured element or cross wall 65, and suitable means are provided to filter the light emitted by the lamp before it reaches the eyes of the patient at the opposite open end of the casing 21. This filtering is accomplished by interposing light filters between the bulb and the eyes preferably close to the apertured element (wall 65), said filters, in order to secure proper frequency band, are calibrated against a known source of light, in the present instance a 50-watt incandescent electric bulb. The essential frequency bands or tones that are employed in this apparatus have been carefully selected from the visible range of the spectrum and consist of such frequency bands as experiments and tests have shown as creating the most beneficial effects upon the senses of a person under treatment. The filters have also been selected with regard to the respective wave-lengths or frequencies transmitted or removed, such, for example, as charted at the beginning of this specification, and as far as possible such filtered colors have been named in the windows of the wheels shown in Figs. 7, 8 and 9. These names, however, are not arbitrary but merely typical.

The light filters are mounted in windows made in three rotatably mounted wheels 92, 93 and 94, the first wheel 92 being nearest the patient, the third wheel 94 being farthest from the patient (or closest to the light source), and the second wheel 93 being the center wheel disposed intermediate the first and third wheel.

As a substitute for the wheels, the filters may be in the form of slides, or individually mounted in slotted cells, or the frequencies may be secured by optical dispersive, emissive or other convenient workable means. These wheels are shown respectively in Figures 7, 8 and 9, and since the colors are especially selected tones, and several may occur in the same color octave of the spectrum, the filters are identified on the wheels by Greek letters such as alpha, delta, theta, etc.

Thus, for example, "omega" designates a particular shade of dark-blue on any or all of the wheels, while "upsilon" identifies a particular shade of navy-blue on any wheel.

The filter carrying wheels are rotatably mounted in transverse slots 95, 96 and 97 in the cylindrical casing 21 close to the apertured element 65 on separate spindles 98, 99, 100, so that the wheels appear in staggered relation when viewed from front or rear. However, the spindles are disposed so that successive filters on the respective wheels will each register with the aperture 66. At all times three of the windows in the wheels are in registry with this aperture. One window in each wheel, marked "Open" in Figures 7, 8 and 9 does not contain a filter, but is left unobstructed so that the three "open" windows may be alined to permit unobstructed light to be emitted through the casing to the front thereof.

The identifying Greek characters appear upon the edges of the wheels as seen in Figure 1 to indicate the respective window that is positioned in front of the apertured element and stationary pointers cooperate with the Greek characters for purposes of identification.

In order to maintain the wheels in proper positions of registry with the aperture element the edges of the wheels are provided with notches 101, 102, and 103 respectively, and such notches are engaged by spring catches or latches 104, 105 and 106 to releasably retain the wheels in adjusted positions.

The wheel 94 that is positioned nearest the lamp and farthest from the patient contains an "open" window, three colored filters, and there are four translucent image bearing plates in the remaining windows. The colored filter plates are blue, amber yellow and dark purple, and they are designated upon the edge of the wheel by the Roman letters "D" (depressant), "S" (stimulant), and "N" (neurasthenic).

After the operator has determined if the departure from normal is intra-orbital or extra-orbital and has classified the patient, as to his biotype, the latter is seated in front of the proper scopes for nascentization in order to place the nerve centers in a most receptive mood. Since different conditions in a given patient require different treatment during nascentizing, the operator must carefully choose the proper scopes and see to it that the red scope is in front of the non-dominant or non-fixating eye. The collimating lens should be moved into the casing across the axis thereof and all the wheels positioned at "open" to permit unobstructed light rays to pass through the lens 61, where they are paralleled, to the front of the casing. Usually a patient may be nascentized in three to five minutes.

In lieu of using the scopes for nascentization the patient may be required to fixate an opaque spot interposed in the path of the filtered light. This will retain the macular area of the retina in shadow thus permitting the selected light frequency to impinge upon the perimacular regions. This alternative method nascentizes the patient simultaneously with the syntonization.

The patient having been placed in a receptive state, light of the selected frequency band is directed to the eyes through the medium of the filters after the scopes have been removed, and such light may be flashed off and on at a desired speed per minute depending upon the defect or abnormality it is desired to correct, modify or relieve. A flashing colored light causes ocular, optical or retinal calisthenics, thus stimulating the centers where abnormality or defect is present.

The application (called syntonization) is continued for the proper length of time, and is repeated or modified at the next visit of the patient. Thus, for example, it has been ascertained that through direct stimulation of the retina with selected light frequencies in the visible range of the spectrum, amblyopia may often be corrected in a few treatments where formerly months of time were necessary to correct this defect of sight.

As hereinbefore stated, exercise and stimulation of the extra-ocular muscles of the eyes may be given by causing the patient to observe an apparent orbital movement of the light which apparent movement may be readily done by rotating a prism or prisms interposed between the light and the eye or eyes.

In order to attain the result just mentioned the structure detailed in Figures 12 to 15 inclusive is removably mounted upon the viewing end of the hollow casing 21 after both pairs of scopes have been folded back upon the top of said casing. The structure disclosed merely typifies an adaptation of the principle and the details may be varied according to desire. It consists of a hollow extension 110 of the main casing 21 having shape and dimensions similar to the viewing end of said casing and provided with hook-shaped lugs 111 that engage the upstanding bead or terminal rib 21ª of the casing. Any securing means may be employed such as a wing-bolt 112 passing through the lower portion of the extension wall to engage an adjacent part of the casing. In the interior of the extension there is a transverse web or wall 113 extending from side to side and provided with spaced windows 113ª or openings of sufficient size and spaced apart a distance to accommodate the pupillary separation of the eyes of different patients. Suitable annular holders or retainers 114 of L-shape cross-section surround the windows and afford guides in which prismatic elements may be rotatably mounted.

It is preferred to use a single prism 115 in one of the retainers unless in some instance the use of two prisms is indicated. This prism is a transparent element of disk-like shape that is surrounded by a bezel 116 of U-shape section in which the prism is cemented. The outer face of the bezel is provided with worm-teeth 117 that are engaged by and meshed with the teeth of a rotatable worm 118, projecting through a cut-out portion of the holder 114. This worm is on the inner portion of a horizontal rod 119 that rotates in bearing bosses 120 and extends across the wall tangent to the upper segments of the holders and the ends of the rod project beyond the bearings where they are provided with suitable cranks 121 whereby they may be manually rotated at either side of the apparatus. When a second prism is used, the holder at the left (Fig. 12) is removed and a unit similar to that above described at the right is placed in the left hand window and calibrated and synchronized with the unit already installed. It will be understood that both prisms must be in the same position relative to their oblique faces and are rotated at the same speed by the operator. In lieu of hand operation a clockwork may be used, or a small motor properly geared down may be connected by a flexible shaft or in some other manner to the rod 119.

When the prismatic structure is rotated in front of the patient between the light and the eyes it will cause the light to appear to move in a circular path or orbit. This will create stimulation by exercising the extra-ocular muscles of the eyes, and such exercise may be carried on while the patient is receiving the syntonizing treatment thus performing the two functions simultaneously.

So far as known, this apparatus and its associated technique is the first to make use of a selected light frequency in correcting or eradicating a particular departure from normal through the use of the optical nervous and reflex mechanisms of the eye as a receptor. The present invention is also the first to nascentize patients by the use of colored light to condition them or render them susceptible to the prescribed light frequency application. Therefore, such formulae are claimed in their broadest aspects herein.

What is claimed is:—

1. An apparatus of the kind described comprising an elongated tubular casing, a lamp at one end of said casing, removable colored scopes at the viewing end of said casing in front of the patient, a plurality of colored light filters mounted on said casing and adapted to be moved into and out of the casing between said lamp and the viewing end of said casing, a collimating lens interposed in the path of light passing through said casing and means for selectively and intermittently flashing said lamp on and off at different speeds.

2. An optical apparatus of the kind described comprising an elongated tubular casing open at its viewing end, a lamp-house and lamp at the other end of said casing, colored scopes adapted to be positioned across the open end of said casing, an apertured element adjacent said lamp-house through which light rays from the lamp pass to the viewing end of the casing, a plurality of rotatable colored light filters adapted to be moved into and out of the casing between said lamp and the viewing end of the casing, a collimating lens interposed in the path of light passing through said casing and means for intermittently flashing said lamp on and off.

3. An optical apparatus of the kind described comprising an elongated tubular casing open at its viewing end, a lamp-house and lamp at the other end of said casing, colored scopes adapted to be positioned across the open end of said casing, an apertured element adjacent said lamp-house through which light rays from the lamp pass to the viewing end of the casing, a rotatable disk movable into and out of said casing adjacent said apertured element, a plurality of color filters carried by said disk and adapted to be successively positioned in registry with the aperture in said element, a collimating lens interposed between said filters and the viewing end of said casing, and means for intermittently flashing said lamp on and off.

4. An optical apparatus of the kind described comprising an elongated hollow casing open at its viewing end, a lamp-house and lamp at the other end of said casing, colored scopes hinged to said casing and adapted to be positioned across the open end thereof, a plurality of rotatable disks mounted on said casing for movement transversely across the axis thereof, said disks each having a concentric series of windows, colored filters in said windows, a collimating lens interposed between said filters and the viewing end of said casing, and means for causing a rhythmic flashing of said lamp.

5. An optical apparatus of the kind described comprising an elongated hollow casing open at its viewing end, a lamp-house and lamp at the other end of said casing, colored scopes hinged to said casing and adapted to be positioned across the open end thereof, an apertured element in front of said lamp, a plurality of rotatable disks mounted on said casing for movement transversely across the axis thereof, said disks each having a concentric series of windows adapted to be successively positioned in register with the aperture in said element, colored filters in said windows, a collimating lens interposed between said filters and the viewing end of said casing, and means for causing a rhythmic flashing of said lamp.

6. An optical apparatus of the kind described comprising an elongated hollow casing open at its viewing end, a lamp-house and lamp at the other end of said casing, a translucent collimating lens adapted to diffuse and parallel the light rays passing through said casing, a pair of similarly colored scopes mounted on said casing and adapted to be positioned in the open end of the casing, a pair of complementary colored scopes mounted on said casing for disposition at the open end of the casing, and reversible means upon which the complementary scopes are adjustably mounted whereby the colors may be reversed for the respective eyes of a patient.

7. An optical apparatus of the kind described comprising an elongated hollow casing open at its viewing end, a lamp enclosed at the other end of said casing, a collimating lens removably positioned in the path of light in said casing, a pair of complementary colored scopes removably positioned at the open end of the casing, and mounting means for said scopes consisting of a link hinged on said casing, a ball and socket joint at the free end of said link, and a guide rod extending between upper and lower portions of said scopes and having sliding connection with one of the members of said joint whereby the disposition of the scopes with respect to each other may be reversed.

HARRY RILEY SPITLER.
ALEXANDER S. CAMERON.